J. A. McCASKELL.
PROCESS OF REFINING SUGAR LIQUOR.
APPLICATION FILED AUG. 17, 1915. RENEWED FEB. 5, 1917.
1,221,553.
Patented Apr. 3, 1917.
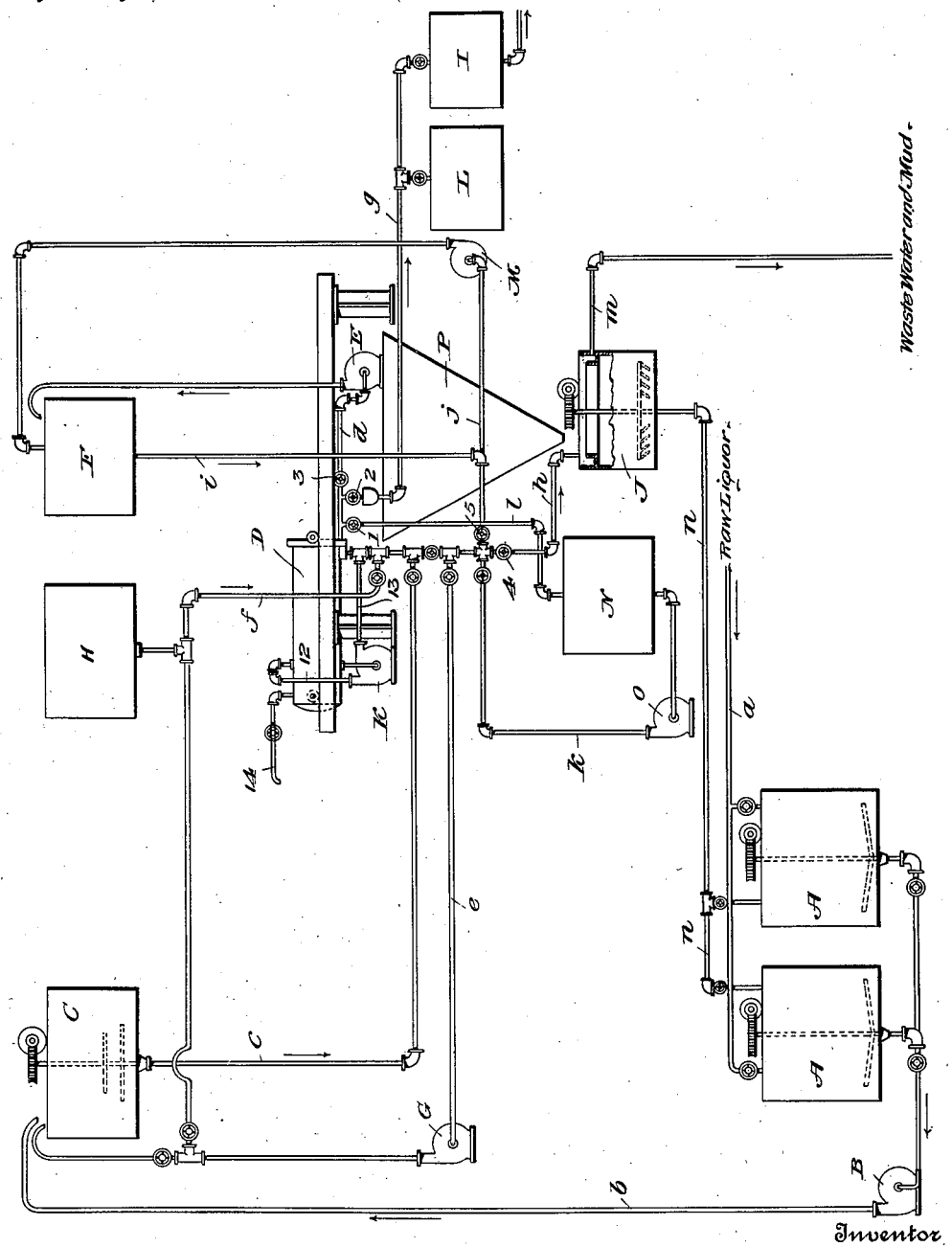
Witness
Inventor
Jasper A. McCaskell.
By T. Walter Fowler
Attorney

UNITED STATES PATENT OFFICE.

JASPER A. McCASKELL, OF SALT LAKE CITY, UTAH.

PROCESS OF REFINING SUGAR LIQUOR.

1,221,553.   Specification of Letters Patent.   Patented Apr. 3, 1917.

Application filed August 17, 1915, Serial No. 45,900. Renewed February 5, 1917. Serial No. 146,848.

*To all whom it may concern:*

Be it known that I, JASPER A. McCASKELL, a citizen of the United States, residing at Salt Lake City, in the county of Salt Lake and State of Utah, have invented certain new and useful Improvements in Processes of Refining Sugar Liquor, of which the following is a specification.

My invention relates to a process for clarifying or refining raw, wholly, or partially refined sugar juices or liquors and the invention consists of the steps and the order or succession of steps constituting the process which I will hereinafter describe and claim.

In the accompanying drawing the figure illustrates, to some extent diagrammatically, one embodiment of apparatus by which my process may be carried out.

The apparatus shown comprises a suitable tank or tanks, A, adapted to contain a mixture of sugar-liquor and bone-char, said tank or tanks having a pipe, $b$, for delivering the solution into a tank, C. In the pipe line, $b$, is a suitable pump, B, for assisting the flow of the mixture of sugar-liquor and bone-char through the pipe to the receiving tank, C.

In the receiving tank is mounted a suitable agitator and connecting with the bottom of this tank is a pipe, $c$, which connects with the bottom of a pressure-filter tank, D, of any suitable construction, such for instance, as is disclosed in the Kelly Patent Number 815,021, dated March 13, 1906, and others of a similar nature, which are so well known that a detailed showing of the same is unnecessary.

The filter tank has a pipe, 12, leading from its upper end and connecting with a pump, K, the outlet of which is connected by a suitable pipe line, 13, to the bottom of the forward end of the pressure tank, whereby a continuous circulation of the solution with which the pressure tank is charged may be maintained.

The pressure tank also has a suitable valve-controlled overflow pipe, 14, leading from its upper end and which permits the escape of air which is displaced when filling the tank with the aforesaid solution.

The filter tank contains as usual suitable filter leaves or frames, not shown, and from each of these leads a pipe, $d$, through which the clear filtrate may be discharged.

The apparatus further comprises a wash-water tank, H, which through a suitable pipe line, $f$, is connected to the filter press, D; also a storage tank, F, for filtered liquor, which is received from the pipes, $d$, connecting with the interior of the filter frames or leaves, in the manner common to filter presses of the type described, and which clear liquor is delivered to the tank, F, through the agency of a suitable pump, E, and a discharge pipe therefrom.

The apparatus shown for illustrative purposes, further comprises a tank, N, adapted to contain a caustic soda solution, said tank connecting with the filter press, D, and being provided with circulating pipes, $k$—$l$, which latter connects with the aforesaid pipe, $d$.

There is also a receiver or hopper, P, into which the filter press discharges its contained cake after the same has been washed and is ready for discharge, which hopper or receiver is in communication with a tank, J, in which operates a suitable agitator for stirring up the contents of this tank, thereby facilitating the separation by gravity of the lighter from the heavier particles of the filter cake, the aforesaid separatory tank, J, being connected by a suitable pipe line, $n$, with the mixing tanks, A, before mentioned.

Other tanks, L, and I, with pipe lines connecting therewith and the parts heretofore described, may be employed and the purpose of these tanks and those heretofore mentioned, together with the various pipe-lines and means for controlling the flow of fluid through the same, will be more readily understood from the following description of the operation of my process, although it will be understood that I do not limit my process to the type of apparatus shown or in fact to any particular apparatus, but I intend that any and all types of apparatus wherein the process may be successfully carried out shall come within the scope of my invention.

In operating the process, a raw-sugar liquor is admitted through a suitable pipe, $a$, into one or more mixing tanks, A, in which operates a suitable agitator. This raw sugar liquor is, in the first instance, mixed with bone-char or any other decolorizing and filtering medium that will give the desired results. I, however, prefer to use bone-char as I have found my experiments with it give the best results.

The mixture of sugar-liquor and bone-char is thoroughly agitated in the tank or tanks, A, so that there shall be a thorough commingling of the particles and this mixture of the char and the sugar-liquor is then delivered through the agency of the pump, B, and the pipe, b, to the receiving tank, C. From this latter tank, which is provided with an agitating device for the purpose of thoroughly stirring up the ingredients and maintaining the char in suspension, the combined mixture of char and sugar-liquor is sent through the pipe, c, to the filter press, D, where occurs a separation of the char and foreign matter from the clear sugar solution, and which operation is thoroughly familiar to those skilled in this art or familiar with the construction and operation of filter-presses. The solid constituents of the mixture admitted to the filter-press, gradually build up on the outside of the filter-frames, with which the press is supplied, as usual, and forms a cake composed of bone-char and mud or other foreign matter, while the liquid constituent, which is in the form of a clear sugar liquor, passes to the interior of the filter frames and thence escapes through pipes, d, leading to the outside of the filter-press, and connecting with the intake of a pump, E, so that the said clear solution may be sent to the tank, F, which is a storage tank for filtered liquor. During this operation suitable valves, 1 and 2, in pipes leading from the filtrate pipes, d, are closed and a valve, 3, in said pipe, d, is open to permit the clear sugar-liquor to be delivered to the pump, as before described. While this filtering operation is going on, the pump, K, is continually operated, thus drawing the liquor from the bottom of the tank and forcing it into the top of the filter-press, so as to always keep the char in suspension during the filtering operation.

After a certain length of time, depending upon the most economical filtering period, the excess liquor in the filter press, D, is withdrawn through a pipe, e, which connects with the bottom of the filter-press, and which withdrawn liquor may be sent back to the storage tank, C, through the medium of the pump, G, in the pipe line, e, before mentioned. After this operation of withdrawing the excess liquor from the press, the filtered liquor which heretofore has been stored in the tank, F, is admitted to the press through the pipe, i, by opening a suitable valve, 5, and establishing a direct connection between the tank, F, and the interior of the filter-press. The filtered liquor thus admitted to the filter-press is under pressure and accordingly is forced through the char-cake that has accumulated upon the sides of the filter leaves and the cake has the property of decolorizing the liquor to the desired extent and there results a finished filtrate which flows through the pipe, d, and a suitable valve-controlled pipe, g, to the storage tank, L, for filtered liquor. The liquor in this tank is now in a condition that it can be sent to evaporating pans to be made into white sugar.

The excess liquor in the filter-press is now returned through a pipe, j, and pump, M, to the liquor tank, F. Clear water is then admitted to the filter press from the clear water tank, H, through pipe, f, until the filter-press casing is full of clear water and this water has a continuous flow through the filter leaves and out through the pipe, d, and the valve, 2, and pipe, g, to the sweet-water tank, I. During this operation the valves, 1 and 3, are closed and the valve, 2, is open. This stage of the process is known in the art as "sweetening off" and the operation continues until the desired percentage of sugar content in the cake is obtained; that is, until a limit has been reached where the value of the remaining sugar content in the cake will not justify the cost of further washing, the dissolved sugar content being carried to the interior of the filter frame and finally into the discharge pipe, d. The excess water contained in the filter-press casing is now drained off through the pipe, h, by opening the valve, 4, and this water is either run to waste or is sent to the agitating tank, J.

The char-cake in the filter-press contains the impurities that were originally contained in the raw sugar liquor. This char can be revivified in two ways, either by treating it with a caustic soda solution or by burning it in kilns without the access of air. When treating this char with the caustic soda solution, the latter is pumped from the tank, N, through pump, O, and pipe, k, to the filter press and when the press is full of this caustic soda solution, the filtering cocks are opened and the solution runs through the pipe, l, back to the storage tank, N. During the passage of this caustic soda solution through the cake, the char is revivified so that it has the power to decolorize additional raw sugar liquor, which can be run from the tank, F, through the press in the manner before described, the amount of liquor depending upon the economical limit as found in the presses used. The char would doubtless have to be again revivified with the caustic soda solution as before described, before proceeding further with the operation. To make this latter statement clear I will say that the char will absorb a certain amount of coloring matter in the form of fine particles remaining in suspension in the solution. Consequently, the sugar liquor is run through the char cake until such a time that it will absorb no more of the coloring impurities in the sugar liquor. When that stage is reached, it is necessary to drain out the excess sugar liquor and wash the cake with a caustic soda solution. If this were not done, the clarification and decolorization of the sugar liquor would not be properly performed.

It may be found advisable not to filter the liquor from the storage tank, F, a second time through the char and in that case the press is at once opened and the filter leaves removed to the outside of the press in the manner well understood by those familiar with filter presses of the type shown and described, and the cake on the outside of the filter leaves is discharged by any suitable means, into a hopper, P. Before this operation, however, any excess of caustic solution in the tank, D, is first drained off and returned to the supply tank, N.

In filtering the raw liquor through the filter press the first time, a char cake is formed on the filter leaves. Sometimes the extent of the decolorization is not sufficient to allow this liquor being sent to the evaporators. Consequently, it is returned through the same char cake for a further decolorizing effect. If, however, the first treatment in the press is sufficient to produce a liquor that is sufficiently decolorized to be used in further treatment, there is no necessity of returning this liquor through the press again. In that case, the press is opened, after the solution has been drained off and the cake is dumped in the hopper, P.

From the hopper, P, the mixture of char and mud is dropped into the tank, J, where it is thoroughly agitated and the lighter mud and foreign material will float off through a pipe $m$, from whence it may be run to waste; the clean char which has a greater specific gravity than the mud, settles in the bottom of the tank, J, and may be drawn off through the pipe, $n$, leading therefrom, and may then be sent into the tank or tanks, A, and mixed with a proportion of new raw sugar liquor admitted to said tank or tanks through the inlet pipe, $a$, thus completing the circuit.

The char thus performs two duties; it acts as a decolorizing agent by removing the fine suspended matter and as a medium for collecting the coarser foreign matter in the raw sugar liquor.

From the foregoing description it will be appreciated that I have disclosed a process for filtering and decolorizing raw sugar liquor wherein there is a great saving both in labor and in handling the sugar liquor.

I am aware that bone-char has been used for decolorizing sugar-liquor, and that it is also not broadly new to revivify the char by washing it with caustic soda solution, but the methods heretofore used for these purposes and for refining sugar are costly and the loss of sugar has been excessive. In my invention I use the char as the medium for catching the mud and gummy matters which exist in the sugar solution and the cake which is formed of the char and the deposited mud and gums is washed in an agitating vessel to remove the mud and gums that are associated with the char, and because of the difference in the specific gravity between the bone-char and the mud, the separation of the washed char from the mud can be readily and cheaply accomplished by mechanical means, and there is no waste of char or of decolorizing medium such as occurs when other filter mediums are employed and which are so light that they will float and thus pass off with the mud and foreign matter, which I effectively separate from the more valuable and heavier bone-char, and which latter after being thoroughly washed, is again mixed with a proportion of fresh raw sugar liquor. This use of a decolorizing carbon, as bone-char, or other filtering medium of heavier specific gravity than the mud and gum, which form a part of a filter-cake, constitutes a leading part of my present invention, and which mud and gums, if allowed to pass off with the char would decrease the clarifying and decolorizing efficiency of the latter and finally result in the char being discarded for filtering purposes.

The time item in the handling of the bone-char and the revivifying of it, together with the increased rate of filtration obtained by its use and the simple method of cleaning bone-char from its associated foreign matter also results in a big saving in the cost of treating raw-sugar juices.

While I have referred to this invention as being primarily intended for the treatment of sugar-liquor, the process described may be used for similar refining and chemical purposes; for instance, in oil refining in which the same sequence of operations can be carried on with equally as great a saving as has been demonstrated in the filtering of sugar liquor. Because of this it is not my purpose to limit the present invention to the treatment of sugar solution only, but I intend that the process shall apply to the filtering and refining of any solution which may be successfully treated by the process described.

Having thus described my invention what I claim as new and desire to secure by Letters Patent is:—

1. The process substantially as herein described of filtering and decolorizing liquids containing separable solids, said process consisting, essentially, in mixing a filtering medium of greater specific gravity than the foreign materials in said liquid, with said liquid and filtering the mixture to separate the liquid content thereof from the said filtering medium and to form a filter cake of said medium, utilizing the cake of separated filtering medium to filter out the solids normally in said liquid and to decolorize said liquid, and then disintegrating the cake and separating therefrom the associated lighter and valueless constituents and thereby preparing the filtering medium for re-use with another portion of original liquid to be filtered and decolorized.

2. The process substantially as herein described of filtering and decolorizing liquids containing separable solids, said process consisting, essentially, in mixing a filtering medium of greater specific gravity than the foreign materials in said liquid, with said liquid and filtering the mixture to separate the liquid content thereof from the said filtering medium and to form a filter cake of said medium, utilizing the cake of separated filtering medium to filter out the solids normally in said liquid and to decolorize said liquid, then washing the cake of remaining traces of the liquid, and then disintegrating the cake and separating therefrom the associated lighter and valueless constituents and thereby preparing the filtering medium for re-use with another portion of original liquid to be filtered and decolorized.

3. The process substantially as herein described of filtering and decolorizing liquids containing separable solids, said process consisting, essentially, in mixing a filtering medium of greater specific gravity than the foreign materials in said liquid, with said liquid and filtering the mixture to separate the liquid content thereof from the said filtering medium and to form a filter cake of said medium, utilizing the cake of separated filtering medium to filter out the solids normally in said liquid and to decolorize said liquid, washing the cake of remaining traces of the liquid, removing the cake, disintegrating the cake by the aid of a liquid, and then recovering the filtering medium constituent of the disintegrated cake by floating off therefrom the associated lighter and valueless constituents of said cake.

4. The process substantially as herein described of filtering and decolorizing liquids containing separable solids, said process consisting, essentially, in mixing a filtering medium of greater specific gravity than the foreign materials in said liquid, with said liquid and filtering the mixture to separate the liquid content thereof from the said filtering medium and to form a filter cake of said medium, utilizing the cake of separated filtering medium to filter out the solids normally in said liquid and to decolorize said liquid, then, while the cake is *in situ*, revivifying the filtering medium and utilizing the revivified medium for filtering and decolorizing additional liquid, then washing the cake of remaining traces of the revivifying agent, and finally, disintegrating the cake and separating therefrom the lighter and valueless constituents and thereby preparing the filtering medium for re-use with another portion of original liquid to be filtered.

5. The process substantially as herein described of filtering and decolorizing liquids containing separable solids, said process consisting, essentially, in mixing a filtering medium of greater specific gravity than the foreign materials in said liquid, with said liquid and filtering the mixture to separate the liquid content thereof from the said filtering medium and to form a filter cake of said medium, utilizing the cake of separated filtering medium to filter out the solids normally in said liquid and to decolorize said liquid, then, while the cake is *in situ*, revivifying the filtering medium and utilizing the revivified medium for filtering and decolorizing additional liquid, then washing the cake of remaining traces of the revivifying agent, removing the cake from its filtering position, disintegrating said cake, and separating the filter content of the cake from the lighter valueless portions thereof by floating off the latter.

6. The process herein described, of filtering and decolorizing liquids, said process consisting, essentially, in mixing a filtering and decolorizing agent of greater specific gravity than the foreign material in said liquid, with the liquid and forming a cake of said agent and of the foreign solids originally contained in the liquid, and removing the cake from its filtering position and separating the filtering agent from the associated valueless content of the cake by the difference in the specific gravity of the heavier filtering agent and said lighter valueless content.

7. The process herein described of filtering and decolorizing liquids, said process consisting, essentially, in mixing a filtering and decolorizing agent of greater specific gravity than the foreign material in said liquid, with the liquid and forming a cake of said agent and of the foreign solids originally contained in the liquid, and removing the cake from its filtering position and separating the filtering agent of greater specific gravity from the associated lighter valueless content of the cake by agitating the suspended mass while in a liquid state and floating off the lighter valueless particles thereof from the associated heavier filtering agent and thus preparing the latter for re-use with an additional liquid to be filtered.

8. The process substantially as herein described of filtering and decolorizing sugar liquor, said process consisting, essentially, in mixing bone-char of greater specific gravity than the foreign materials in said liquid, with said liquid, and filtering the mixture to separate the liquid content thereof from said bone-char and to form a filter cake of said bone-char, utilizing the cake of separated bone-char to filter out the solids normally in said liquid and to decolorize the liquid, then washing the cake of remaining traces of the liquid, and then disintegrating the cake and separating therefrom the lighter and valueless constituents and adding the separated filtering medium to another portion of original liquid to be filtered and decolorized.

9. The process substantially as herein described of filtering and decolorizing sugar liquor, said process consisting, essentially, in mixing bone-char of greater specific gravity than the foreign materials in said liquid, with said liquid, and filtering the mixture to separate the liquid content thereof from said bone-char and to form a filter cake of said bone-char, utilizing the cake of separated bone-char to filter out the solids normally in said liquid and to decolorize the liquid, then washing the cake of remaining traces of the liquid, then removing the cake, and finally, disintegrating the cake and removing therefrom the lighter and valueless constituents and adding the separated filtering medium to another portion of liquor to be filtered.

10. The process substantially as herein described of filtering and decolorizing sugar liquor, said process consisting, essentially, in mixing bone-char with said liquid, and filtering the mixture to separate the liquid content thereof from said bone-char and to form a filter cake of said bone-char, utilizing the cake of separated bone-char to filter out the solids normally in said liquid and to decolorize the liquid, then washing the cake of remaining traces of the liquid, then removing the cake, disintegrating the cake by the aid of a liquid, and then recovering the bone-char constituent of the disintegrated cake by floating off therefrom the associated lighter and valueless constituents of said cake.

11. The process substantially as herein described of filtering and decolorizing sugar liquor, said process consisting, essentially, in mixing bone-char with said liquor and filtering the mixture to separate the liquid content thereof from the bone-char and to form a filter cake of said bone-char, utilizing the cake of separated bone-char to filter out the gums and foreign matter normally in said liquor and to decolorize the liquor, and then, while the cake is *in situ*, revivifying the bone-char and utilizing the revivified bone-char for filtering and decolorizing additional liquor, and finally disintegrating the cake and removing therefrom the contained lighter and valueless constituents and adding the separated filtering medium to another portion of liquor to be filtered.

12. The process herein described of filtering and decolorizing sugar liquors, said process consisting, essentially, in mixing bone-char with the liquor and forming a cake of said bone-char and of the gums and foreign matter originally contained in the liquor, and removing the cake from its filtering position and separating the bone-char from the associated foreign content of the cake by the difference in the specific gravity of the bone-char and said foreign matter.

In testimony whereof I affix my signature in presence of a witness.

JASPER A. McCASKELL.

Witness:
HARRY E. CORSER.